(12) United States Patent
Öberg et al.

(10) Patent No.: US 6,915,075 B1
(45) Date of Patent: Jul. 5, 2005

(54) PROTECTION OF WDM-CHANNELS

(75) Inventors: Magnus Öberg, Hägersten (SE); Nigel Robert Wood, Northants (GB); Jonas Hemgren, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 573 days.

(21) Appl. No.: 09/643,993

(22) Filed: Aug. 23, 2000

(Under 37 CFR 1.47)

Related U.S. Application Data

(63) Continuation of application No. PCT/SE99/00256, filed on Feb. 24, 1999.

(30) Foreign Application Priority Data

Feb. 24, 1998 (SE) .............................................. 9800545
May 12, 1998 (SE) .............................................. 9801642

(51) Int. Cl.[7] .......................... H04B 10/18; H04J 14/00
(52) U.S. Cl. .............................. 398/9; 398/45; 398/67; 398/72
(58) Field of Search ................................ 359/110, 124, 359/133, 143, 173; 398/9, 12, 14, 22, 34, 68, 91

(56) References Cited

U.S. PATENT DOCUMENTS

| | | | |
|---|---|---|---|
| 5,241,610 A | * | 8/1993 | Labiche et al. ................ 385/16 |
| 5,299,293 A | * | 3/1994 | Mestdagh et al. |
| 5,537,241 A | * | 7/1996 | Fisher |
| 5,760,934 A | * | 6/1998 | Sutter et al. |
| 5,790,294 A | * | 8/1998 | Horiuchi et al. |
| 5,877,881 A | * | 3/1999 | Miyauchi et al. |
| 5,943,146 A | * | 8/1999 | Harano |
| 6,081,359 A | * | 6/2000 | Takehana et al. |
| 6,172,782 B1 | * | 1/2001 | Kobayashi .................. 359/128 |

FOREIGN PATENT DOCUMENTS

| | | |
|---|---|---|
| EP | 0 877 502 A2 | 11/1998 |
| FR | 2 756 693 A1 | 6/1998 |
| WO | 97/45977 | 12/1997 |

* cited by examiner

*Primary Examiner*—M. R. Sedighian
*Assistant Examiner*—Dzung Tran
(74) *Attorney, Agent, or Firm*—Nixon & Vanderhye P.C.

(57) ABSTRACT

An optical network comprises a bidirectional link connecting two nodes (1) through two optical fibers (3). Optical output signals from optical transmitters (7) in a node are provided to transponders (11) issuing optical signals of well-defined wavelengths to a power combiner (13), from which optical signals are forwarded to the other node on the respective fiber. The network can have protection for failures of various components. Thus, a spare transponder (21) can receive the optical output signals of an optical transmitter (7) in the case of a failure of an ordinary transponder (11). The spare transponder (21) is also connected to the combiner (13). The optical transmitters (7) and receivers (9) can be duplicated by providing spare transmitters (7') and spare receivers (9'). Various arrangements can be used for connecting the output of a transmitter to an ordinary transponder or the spare transponder. For example, cross-bar switches (17, 19) can be arranged at the outputs of a pair of an ordinary transmitter and a spare transmitter and at the inputs of a pair of an ordinary receiver and a spare receiver. For a node having N−1 ordinary transmitters a N:1 switch (23) is then arranged at the input of the spare transponder (21).

30 Claims, 10 Drawing Sheets

PROTECTION OF WDM-CHANNELS

This application is a continuation of PCT/SE99/00256 filed on Feb. 24, 1999.

TECHNICAL FIELD

The present invention relates to a protecting individual length channels in a WDM link, ring or bus network in the case of a transmitter, transponder or receiver failure, in particular to a network in which at least one link is protected, and to a node used for such protection.

BACKGROUND

In telecommunication optical fibres have been used for several years, primarily owing to their large reliability, their insensitivity to electrical interference and their high capacity. Of course, there is a desire in the existing telecommunication networks to use the available optical fibres in their networks as efficiently as possible, in particular for communication over long distances, since such fibres obviously have high installation costs. By introducing wavelength division multiplexing WDM in existing communication systems using optical fibres a plurality of individual wavelength channels can be transmitted on the same optical fibre and thus the information transmitted over the fibre can be multiplied. Thus the need for installing more optical fibres can be postponed. Also, the telecommunication operators of course want to utilize their existing transmission equipment if possible also when changing to WDM systems or at least to utilize their existing equipment to the highest possible extent.

When using WDM in a link built of a single optical fibre pair between two nodes all information from one node to the other one will be transmitted at each instant over on one of the fibres of the pair. Because of the very large information amount transmitted over the fibre pair, a break-down of such a link will be extremely embarrassing. Thus, the ability of a network to restore communication or traffic on a failed link is very important. Protection must be built into links and networks using optical fibres carrying several WDM channels on optical fibres therebetween. Typical devices, in which failures can arise are of course the fibres themselves which can be cut off and the components in the transmission and receiving equipment.

In U.S. Pat. No. 5,299,293 a protection arrangement is disclosed which can be used in a WDM network. For the case of a faulty electrooptical transmitter, the input signal of the transmitter is coupled to the input of a spare transmitter through a n: 1 electrical switch. The spare transmitter includes a tunable laser adapted to transmit the signal on the same wavelength as used by the defective transmitter. In U.S. Pat. No. 5,457,556 equipment for protecting optical communication to failures of the WDM equipment are disclosed. The published German patent application 44 33 031 discloses redirection of the information flow in an optical line to another line when the first line gets defective. In U.S. Pat. No. 5,218,465 is described how traffic for some failure can be redirected to another redundant path. A cross-connect switch receives all the input signals and is controllable to switch each signal to the redundant path.

In the published International patent application WO 97/45977 "Channel protection in data-communication and telecommunication systems" an optical fiber network is disclosed using WDM, in which each node comprises at least one standby electrooptical transmitter and at least one standby optoelectrical receiver. A spare wavelength is used by the standby transmitter and receiver. The network is the bus type having traffic circulating through the node, in which the nodes tap off and/or add WDM channels as required.

SUMMARY

It is an object of the invention to provide an optical network having protection; in particular including an optical bidirectional link forming or being part of the optical network.

It is a further object of the invention to provide an optical network and nodes to be used in the network having protection working for many cases of different failing components.

It is a further object of the invention to provide nodes to be used in an optical network having protection which can be built from standard components of a relatively robust type, not requiring e.g. tunable lasers.

In a protection arrangement for optical transmitter devices and receiver devices in nodes interconnected by a bidirectional link in a WDM network, a switch is arranged so that when one of the transmitter devices fails, its input signal is connected to a standby transmitter, so that this transmitter forwards the signal on a wavelength not used by the other transmitters. The optical transmitters and receivers of a node of such bidirectional link can be duplicated, a spare optical transmitter and a spare optical receiver being arranged as standby for each ordinary optical transmitter and each ordinary optical receiver. Transponders can be connected to receive the signals to be issued on an optical fiber connecting the nodes, converting the received optical signals to optical signals of well defined wavelengths. The output signals of the transponders are combined in an optical signal combiner or multiplexer and therefrom issued on the optical fiber. In each node, only one spare transponder is arranged as standby for the other, ordinary transponders. By arrangements comprising optical switches and/or optical couplers the optical signals from an ordinary optical transmitter or a spare optical transmitter can be forwarded to the spare transponder and issued thereby on a wavelength separate from the wavelengths used by the ordinary transponders.

Generally a WDM network comprises at least two nodes which are interconnected by a bidirectional optical link. A node in such a network can e.g. comprise at least two pairs of ordinary transmitter devices and ordinary receiver devices so that each pair comprises one ordinary transmitter device and one ordinary receiver device. The devices of such a pair are then arranged to transmit and receive optical signals respectively of only a fixed, individual well defined wavelength band which is separate from the wavelength band used by other pairs.

Such a node can further comprise a pair formed by a spare transmitter device and a spare receiver device. The spare transmitter device and the spare receiver device of this pair are then arranged to respectively transmit and receive optical signals of only a fixed well defined wavelength band different from the wavelength bands in which the ordinary transmitter devices and receiver devices of the other pairs of the node are arranged to transmit and receive respectively optical signals. A switch can be connected in such a way that if one of the ordinary transmitter devices of the node fails, an input signal of said one of the ordinary transmitter devices is connected through the switch to an input of the spare transmitter device.

The ordinary transmitter device of a pair formed by an ordinary transmitter device and an ordinary receiver device of a node can then comprise an ordinary optical transmitter and an ordinary transponder which is connected to the ordinary transmitter. The ordinary optical transmitter is arranged to receive electrical signals and to convert the received electrical signals to issued first optical signals. The ordinary transponder is arranged to receive the first optical signals issued by the ordinary optical transmitter and to convert the received first optical signals to issued second optical signals of the wavelength band, in which the ordinary transmitter device and the ordinary receiver device of the pair are arranged to transmit and receive optical signals respectively. In the same way the spare transmitter device of the pair consisting of a spare transmitter device and a spare receiver device in the node can comprise is at least one spare transmitter and a spare transponder connected to the spare transmitter. The spare transponder is then common to all spare transmitters of the node and is connected to said all spare transmitters to convert received signals to issued third optical signals of the wavelength band, in which the spare transmitter device and the spare receiver device of the pair are arranged to transmit and receive optical signals respectively.

The spare transponder included in the spare transmitter device in the node can through a switch be connected to all the ordinary optical transmitters in the node to receive the first optical signals issued by at most one of the ordinary optical transmitters of the node.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
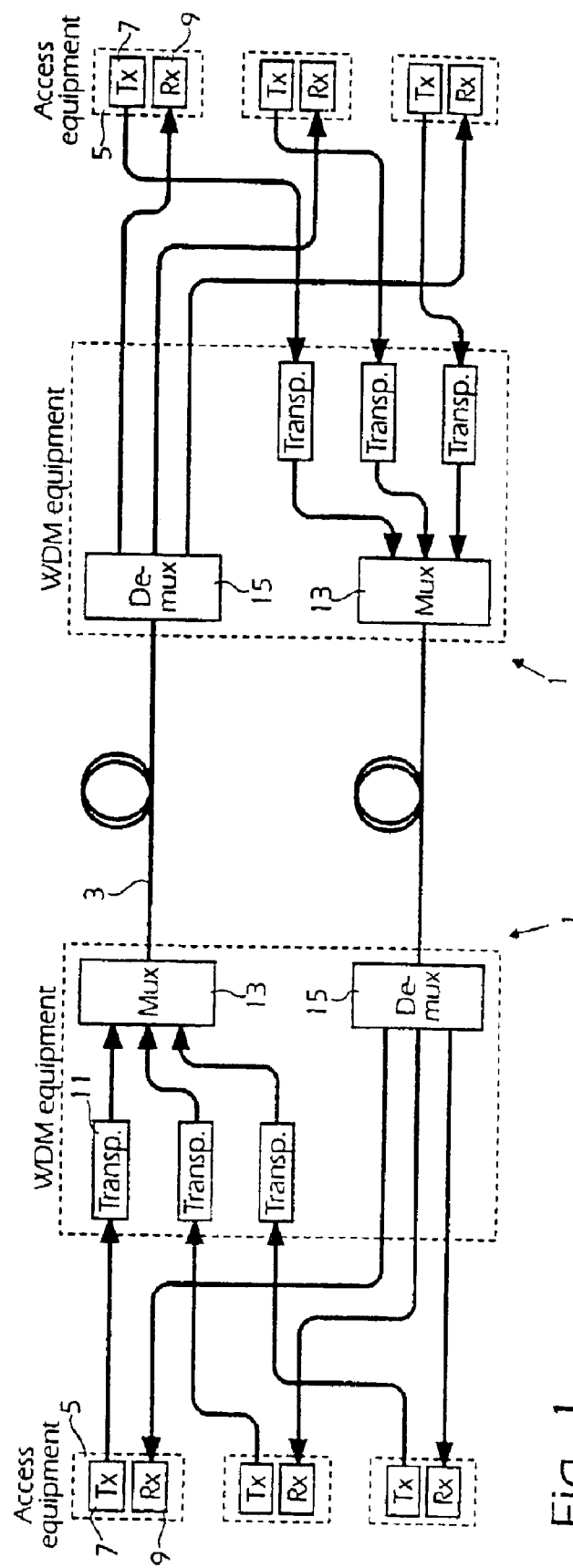
FIG. 1 is a block diagram of a bidirectional WDM link having no protection.

In FIG. 1 a bidirectional WDM link having no protection is illustrated. The link comprises two add and drop nodes 1 connected by one fibre 3 for traffic in a first direction and one fibre for traffic in the opposite direction. The nodes 1 comprise in the embodiment shown three access equipments 5 for three electrical channels, each access equipment 5 comprising a transmitter (Tx) 7 and a receiver (Rx) 9. In the general case N access equipments would be arranged. The transmitters 5 are some kind of electro-optical converters or modulators, such as modulated lasers, providing on their output an optical signal modulated on some wavelength, which can be the same wavelength for all transmitters 7. The optical signal from a transmitter 7 is provided to the input of an associated transponder 11, in which the optical signal from the transmitter 7 is received and is transmitted on a very well defined wavelength. The output fibers of the transponders 11 are connected to an optical multiplexer 13, in which the incoming light signals are combined with or superposed on each other. From the multiplexer 13 the resulting optical signal is transmitted on an optical fibre 3 carrying signals from the considered node 1 to the receiving side of the other node. There, the optical fibre 3 is connected to an optical demultiplexer 15, in which the different wavelengths of the incoming signal are filtered out and are forwarded on optical fibers to the respective receiver 9 in an access equipment 5, the receivers 9 being optoelectrical converters such as suitable PIN-diodes.

In the link illustrated in FIG. 1, the components thereof can of course become defective and stop operating in the intended way. In particular there may be failures in the access 26 equipment 5, in the transmitters 7 and the receivers 9, and in the transponders 11, which are all active optical elements. In order to arrange a protection against such failures a spare or standby channel must be arranged in the link. This standby channel can then be used when one of the components becomes defective. Special arrangements for switching to this standby channel must also be provided and there must also be a redundancy in the access equipment 5.

Figure 2:
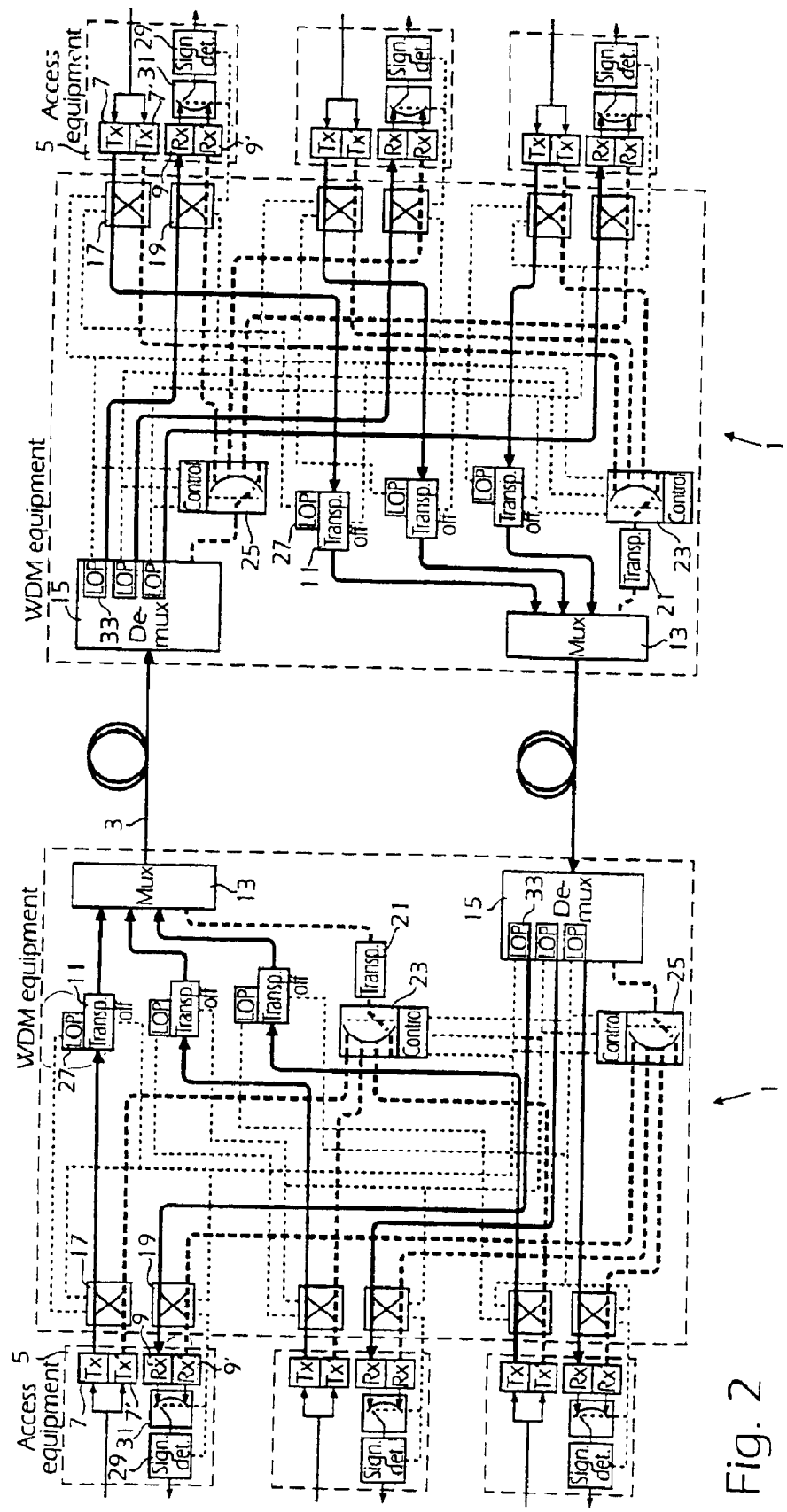
FIG. 2 is a block diagram of a first embodiment of a bidirectional link having protection.

A bidirectional WDM link having such protection is illustrated in the block diagram of FIG. 2. In this link the access equipments 5 contain a 1+1 optical protection and in the nodes 1 there is a 1:3, generally a 1:N, protection of the corresponding three WDM channels, in the general case N WDM channels. Each access equipment 5 at one end, which is thus arranged for an own channel, comprises one working or ordinary optical transmitter 7 and one spare or standby optical transmitter Tx' or 7', and one working or ordinary optical receiver 9 and one spare or standby optical receiver Rx' or 9'. These spare transmitters 7' and receivers 9' can be in an operative state all the time, being supplied with power and the transmitters 7' issuing all the time the same signals as the ordinary transmitters 7.

An optical 2×2 cross-bar space switch 17 has first one of its two inputs connected to an ordinary transmitter 7 and its second input connected to the standby transmitter 7' in the pair of ordinary transmitter and standby transmitter in the same access equipment 5. In the same way, an optical 2×2 cross-bar space switch 19 has one of its two outputs connected to an ordinary receiver 7 and another one of its outputs connected to the standby receiver 7' of a pair of ordinary receiver 7 and standby receiver 7' in the same access equipment 5. A cross-bar switch has two inputs and two outputs and can be in one of two states or positions. In the bar state, which is the ordinary state of the cross-bar switches considered here, it connects a first input to a first output and a second input to a second output, making a "parallel" or "bar" connection. In the cross state, which is the state considered here when the cross-bar switches receive a control signal, it connects the first input to the second output and the second input to the first output, thus making "crossing" connections.

The WDM equipment in the node 1 uses a fourth, standby channel, in the general case a (N+1)-th channel. In the transmitter side thus a transponder 21 for the standby channel is provided, having its output also connected to the multiplexer or combiner 13 and working in parallel with the regular transponders 11. Every transponder 11, 21 will thus transmit on its own specific wavelength. In a cross-bar switch 17 on the transmitting side that output, which in the normal, bar state of the switch is connected to the ordinary transmitter 7, is connected to a regular transponder 11, and its other output, which in the normal, bar state of the cross-bar switch 15 is connected to the spare transmitter 7' is connected to one input of an optical 4:1 space switch 23, this space switch being in the generally case made for switching from of (N+1) inputs to one output. Thus three inputs of the 4:1 switch 23 are in the normal state of the node 1 connected to a single spare transmitter 7'. Thus there is one input of the 4:1 switch 23 which is not connected to anything. In the normal operation of the node 1, in which no components are defective, the 4:1 switch 23 is in its fourth position, in which it does not receive any signals and does not transmit any signal.

At the receiving side the demultiplexer 15 is arranged for splitting the incoming signal into four individual wavelength bands, in the general case into (N+1) individual, distinct wavelengths or wavelength bands. Three of the outputs of the demultiplexer 15 are connected to that input of the respective cross-bar switch 19, to that input thereof which in the normal state of the node 1, in which no components are defective, to the ordinary receiver 9. That output terminal of the demultiplexer 15, which carries the wavelength band generated by the spare transponder 21 on the transmitting side, is connected to a 1:4 optical space switch 25, in the general case to a 1:(N+1) switch. Three outputs of this 1:4 switch 25 are connected to the other one of the inputs of the cross-bar switches 19, to that input thereof which in the normal operation of the node 1 is connected to the spare receiver 9'. The fourth output of the 1:4 switch 25 is terminated and thus does not carry any signals anywhere. This is also the normal position of the 1:4 switch 25 in which all components in the transmitting side and the receiving side of the nodes 1 are working normally.

In the normal state thus all of the cross-bar switches 17, 19 are in their bar state and thus the signals carrying information are transmitted from the ordinary transmitters 7 to the corresponding ordinary transponder 11, via the combiner 13, the fibre link 3 and the demultiplexer 15, to the ordinary receiver 9. The output signals of the hot standby transmitters 7 passes to the 4:1 switch 23 on the transmitting side and are terminated there, since this switch is not in a position for receiving any output from any transmitter, since it is in the fourth position, in the general case its (N+1)-th position.

Now the different cases will be described which can occur when some device in the bidirectional link of FIG. 2 becomes defective.

An access transmitter 7 can become defective. This is detected by the transponder 11, which is connected to this defective transmitter 7 through the respective one of the cross-bar switches 17 and which makes this detection by finding, through a power detector 27 provided on its input terminal, that there is a loss of power on the input terminal. The power detector 27 of the transponder 11 transmits a signal to the cross-bar switch 17 which is connected to the input terminal of the transponder. The cross-bar switch 17 then switches from its bar state to the cross state. The output signal of the standby transmitter 7', which all the time transmits the same signal as the ordinary transmitter 7 in the same pair of ordinary transmitter and standby transmitter will now instead be directed to the same transponder 11 through the crossed path through the cross-bar switch 17 which has changed its position to the cross state.

For a failure of an access receiver 9, this state is detected by a signal processing circuit 29 inside the access equipment 5, which then changes the output to be delivered from the standby receiver 9' in the same pair of ordinary receiver and standby receiver by changing the position of an electric switch 31. A signal is then transmitted to the cross-bar switch 19, which is connected to the input of this pair. This cross-bar switch 19 then switches from its bar state to the cross state and thus directs the light signal from the demultiplexer 15 directly to the operating standby receiver 9' in the pair.

Also one of the regular transponders 11 can become defective. It is detected on the receiving side by the demultiplexer 15, in particular by the loss of power detected by power measurement devices 33. In the receiving side the 1:4 switch 25 and the 4:1 switch 23 are both switched to the position corresponding to the failed wavelength channel. The 1:4 switch 25 connects its input terminal to that cross-bar switch 19, which is connected to the receiver 9, which was to receive the light signal, which now has disappeared or been lost. The 4:1 switch 23 connects in the corresponding way its input terminal, which is connected through a cross-bar switch 17 to the transmitter 7 belonging to the sane access equipment 5 as the receiver 9, which would have received the light signal, which now has disappeared, to its output. Said cross-bar switches 19 and 17 are switched from their bar state to the cross state. Also the transponder 11 is turned off for the wavelength band, on which no signals are received, and the spare transponder 21 on the same receiving side is activated.

In the transmitting node there will then be a loss of power for the same wavelength band, which is sensed by its demultiplexer 15 and then also the transmitting node will be reconfigured in the same way as the receiving node. For both traffic directions the considered signal now passes from the ordinary transmitter 7, through its associated 2×2 cross-bar switch 17, which now is in a cross state, to 4:1 space switch 23 and then the signal is transmitted to the spare transponder 21 in the transmitting node, from the spare transponder 21 to the wavelength combiner 13, through a fibre 3 and to the demultiplexer 15 and from the demultiplexer to that one of its output terminals, which is connected to the 1:4 switch 25, to the correct cross-bar switch 19, which is in its cross state and then up to the ordinary receiver 9 for this channel. This case is also illustrated in FIG. 3.

Figure 3:
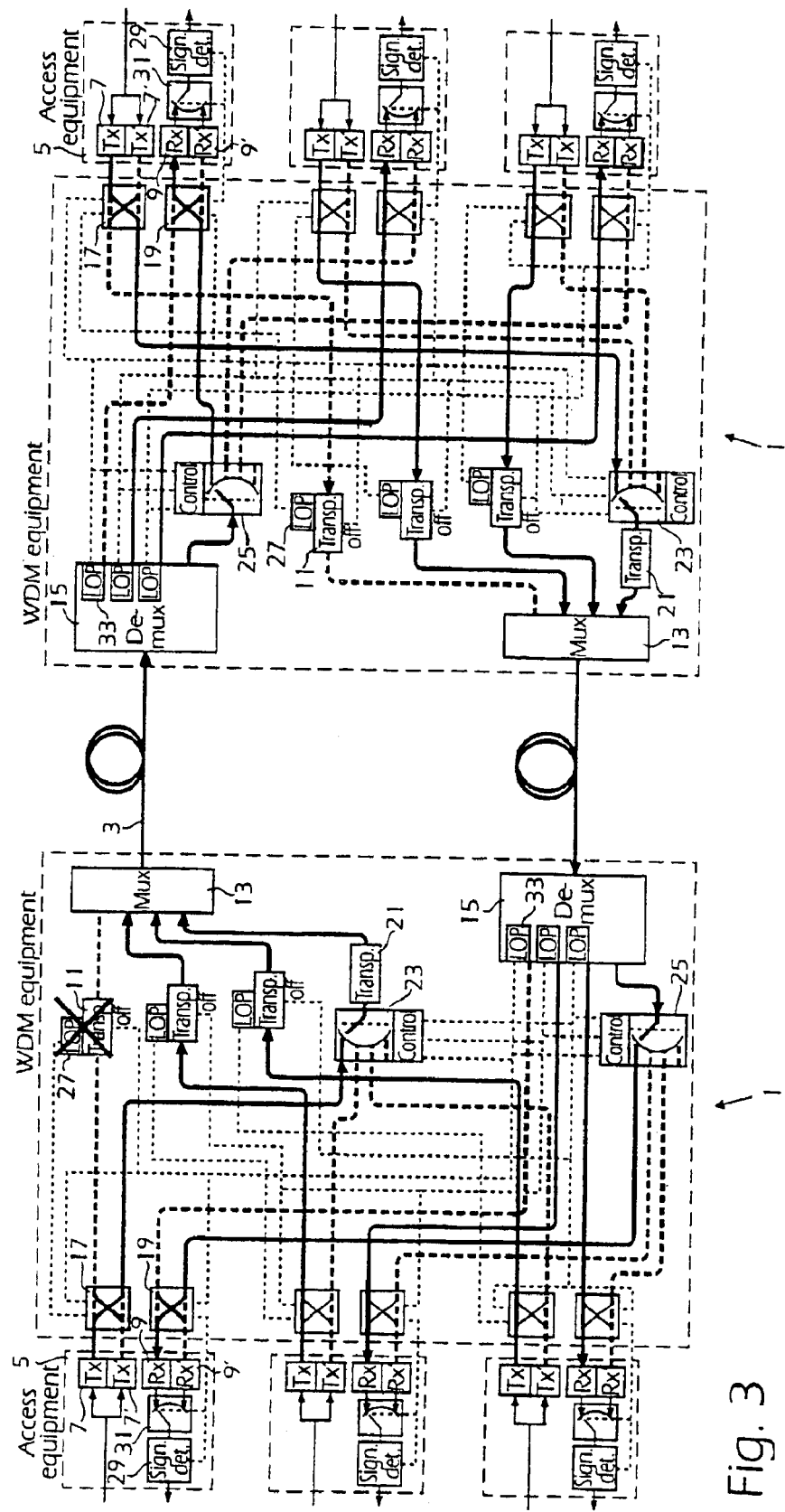
FIG. 3 is a block diagram of the same link as shown in FIG. 2 but illustrating the traffic paths after restoration caused by failure of a transponder.

The node construction illustrated in FIGS. 2 and 3 can be modified in various ways. Thus, in FIG. 4 the same basic node construction is illustrated, in which the 2×2 cross-bar switches 17 connected to the transmitters 7 and the standby transmitters 7' have been omitted. Then the output signal of the ordinary transmitter 7 is directly connected to the input terminal of the respective ordinary transponder 11 and the standby transmitter 9', which always transmits the same signals as the ordinary transmitter 7 is directly connected to the respective input of the 4:1 switch 23.

For a failure of one of the ordinary transmitters 7 the transponder 11 connected to the output of this defective transmitter detects loss of power. Then this transponder 11 is turned off and the spare transponder 21 is activated. Both the 4:1 and 1:4 switches 23, 25 are switched to the position corresponding to the position of the defective transmitter. The cross-bar switch 19 connected to the receiver corresponding to the defective transmitter 7 is switched from its bar state to the cross state, so that the ordinary receiver 9 now receives a light signal from the 1:4 switch 25.

In the other node, in which the defective transmitter 7 is located, loss of power is detected by the demultiplexer 15 by the respective power monitor 33 on the output side thereof. Then also here the 4:1 and 1:4 switches 23, 25 are switched to receive or transmit respectively the wavelength channel corresponding to the channel, for which the loss of power has been detected. The cross-bar switch 19 connected to the receiver 9 is switched from its bar state to the cross state, so that the ordinary receiver 9 now receives a light signal from the 1:4 switch 25. In this side also the respective regular transponder 11 is turned off and the spare transponder 21 is activated.

After the switching has been made, the traffic for both directions now passes from the standby transmitter 7' to the 4:1 switch 23, through the spare transponder 21, through the multiplexer 13 and over the fibre link 3, in the receiving side through the demultiplexer 15 to the 1:4 switch 25, from the respective output port of this switch to the cross-bar switch 19, which is in its cross state, up to the ordinary receiver 9.

Also the cross-bar switches 19 connected to the receivers 9 and 9' can be removed. This case is illustrated in the diagram of FIG. 5. A defective transmitter 7 is detected in the same way as for the node design of FIG. 4. Also all of the switching of the respective elements is the same. Of course no control signals can be passed to the cross-bar switches 17, 19 since there are none. Instead the redirected light signal will not arrive to the ordinary receiver 9 but to the standby receiver 9' in the respective pair of an ordinary receiver and a standby receiver.

Figure 4:
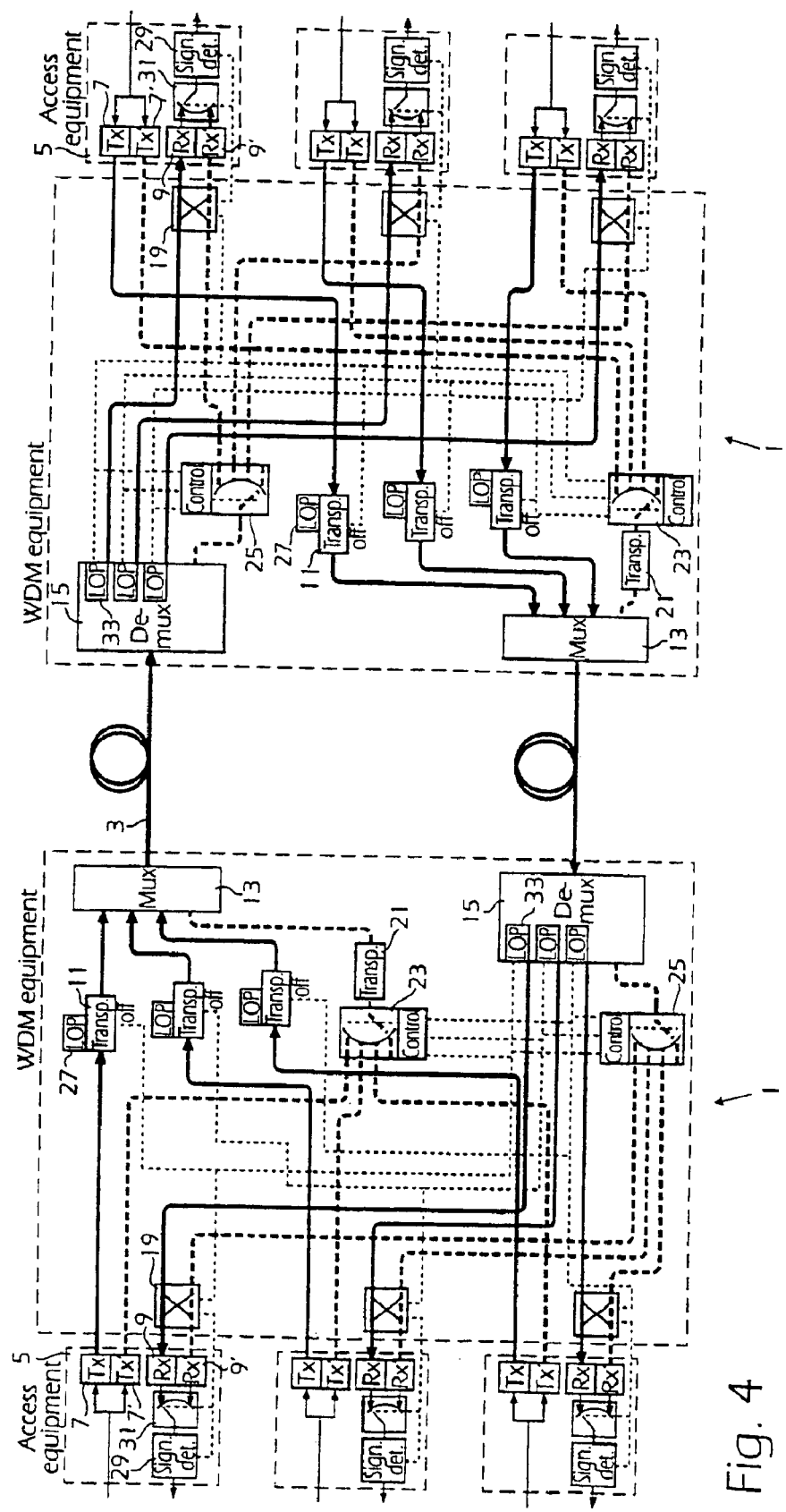
FIGS. 4–9 are block diagrams of further, different embodiments of a bidirectional link having protection.
Figure 5:
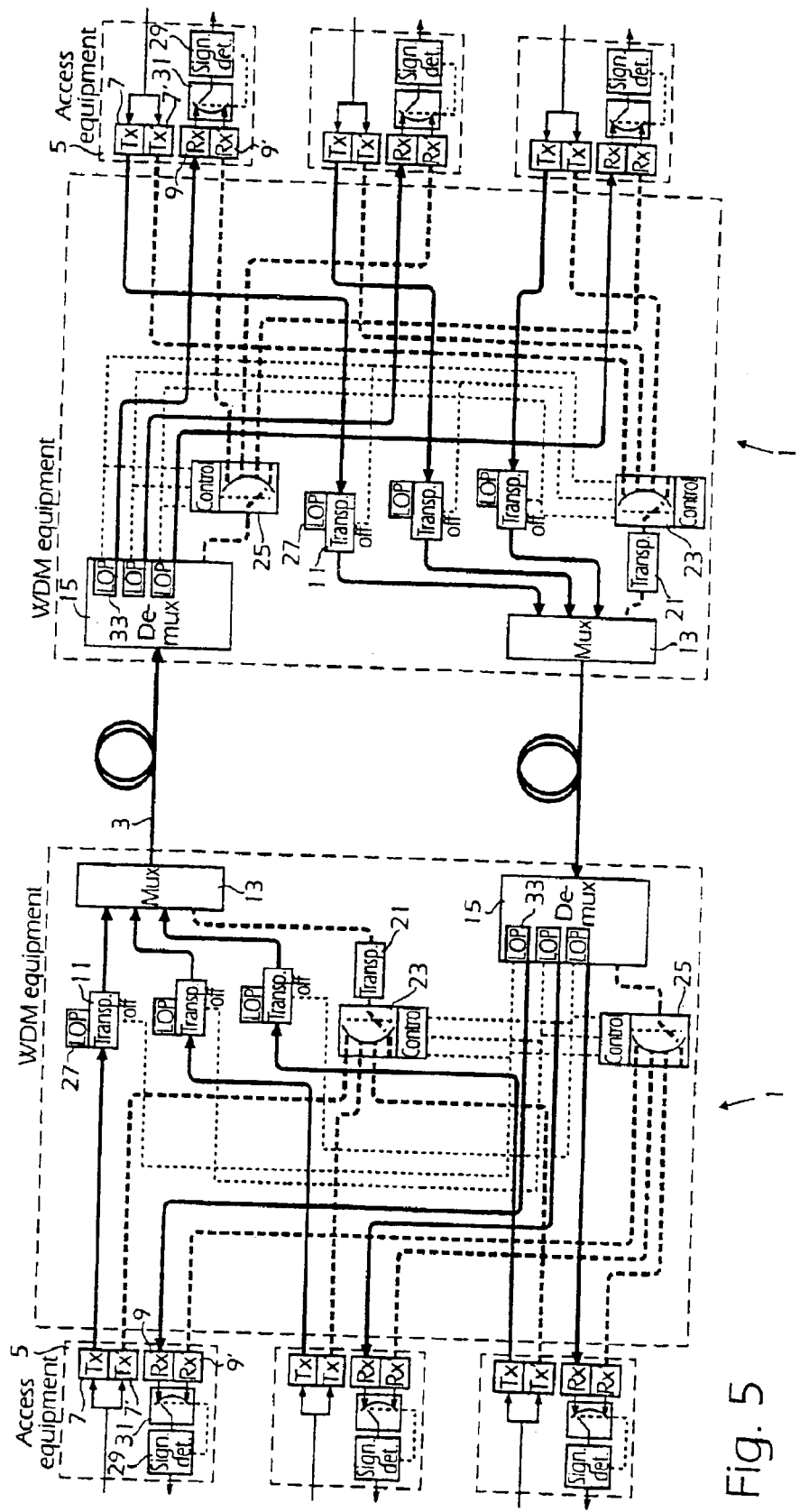

The advantage of the designs of FIGS. 4 and 5 is obviously that no cross-bar switches 17, 19 or at most only one cross-bar switch 19 is arranged in the path of light from a transmitter 7 to a receiver 9. The disadvantage is that if a transmitter 7 fails, the spare transponder 21 will be occupied and it will not be possible to use it as a standby for an ordinary transponder 11.

Figure 6:
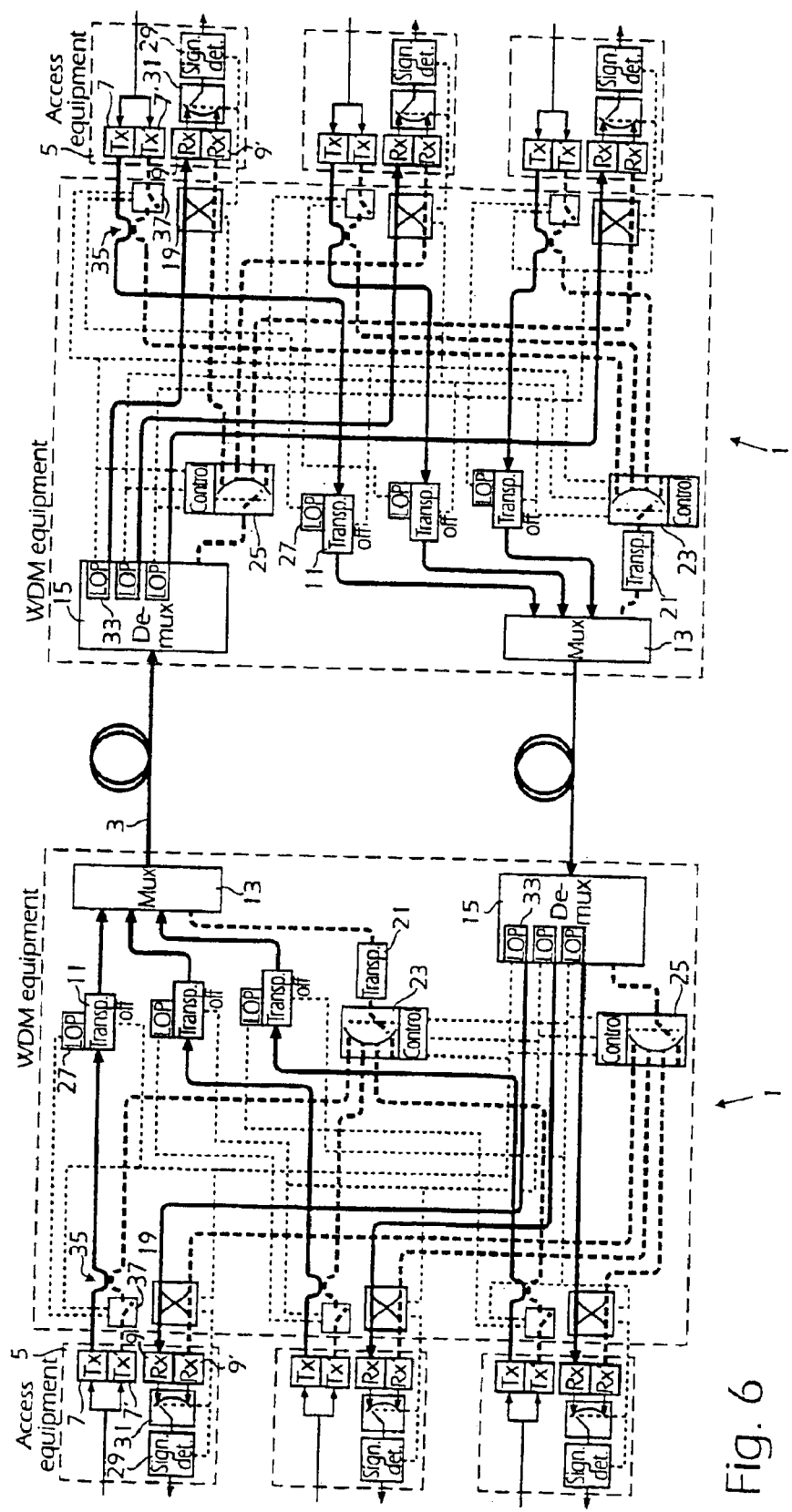

Another modification that is shown in the diagram of FIG. 6 is to replace the cross-bar switches 15 connected to the transmitters by an ordinary 2×2 fibre coupler 35 together with an optical on-off switch 37, the switch being connected between the standby transmitter 7' and the coupler 35. The resulting function will be the same as using a cross-bar switch 17. The advantage of this node design is that there is no cross-bar switch in the path of light after the ordinary transmitter 7. The disadvantage is that the optical power loss for light passing from the transmitters 7 is increased (−3 dB). At this location in the node this will normally be a minor drawback.

Figure 7:
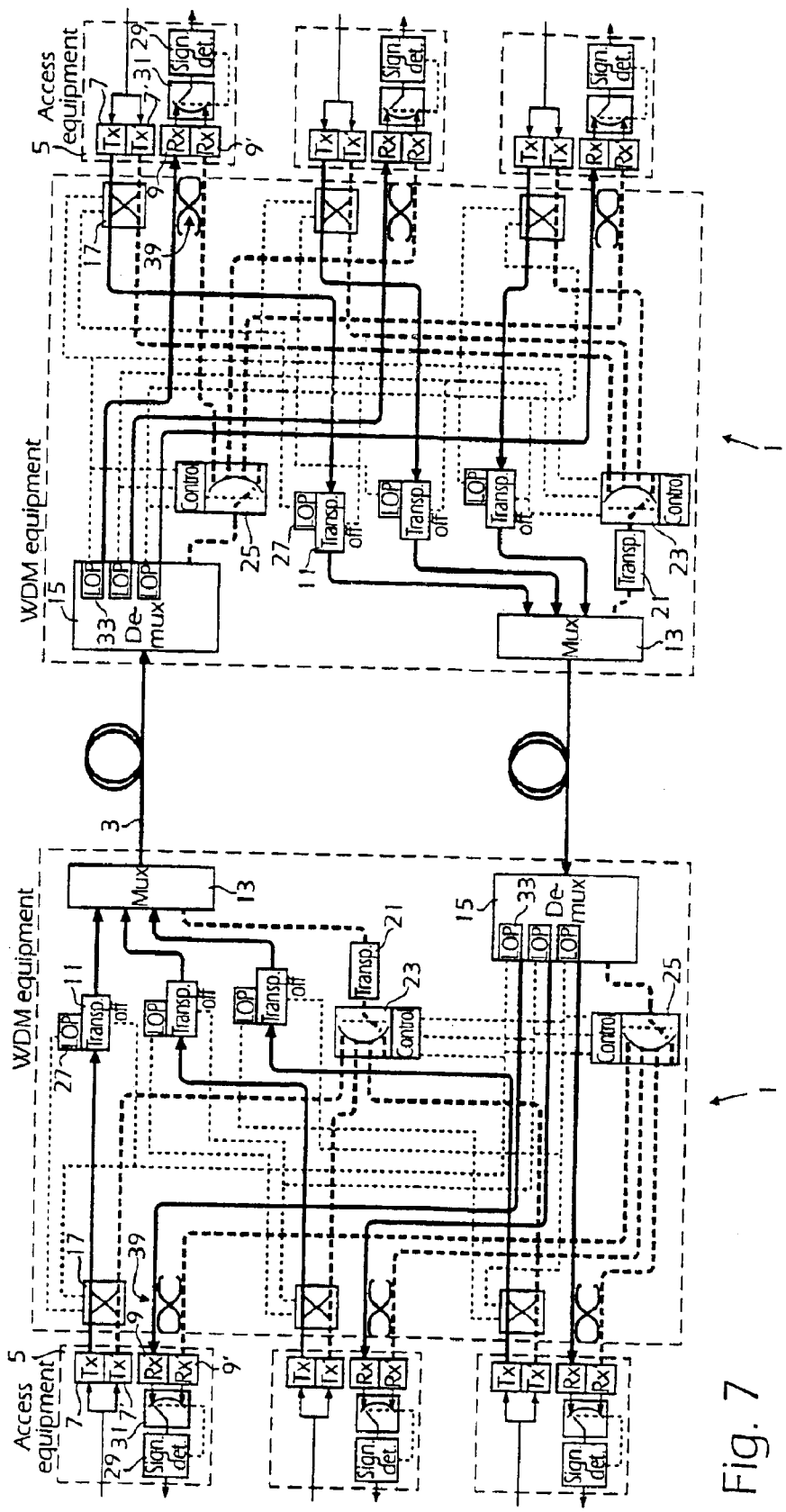

Another modification is illustrated in FIG. 7, in which each 2×2 cross-bar switch 19 connected directly to a pair of receivers 9 and 9' are replaced with four 1:2 50—50% fibre couplers 39 arranged in a fixed cross-bar function operating by power splitting, so that the output from the demultiplexer 15 always reaches both the ordinary receiver 9 and the standby receiver 9' and so that the output from the corresponding port of the 1:4 optical space switch 25 also reaches the two receivers 9, 9' in such a pair simultaneously. For a fault in an ordinary receiver 9, this will be detected by the signal detector 29 in the same access equipment 5 and then there will be an automatic change to the standby receiver 9' by changing the position of the electric switch 31. No more elements have to be switched. A drawback of this construction is an increased optical loss, about −6 dB. The advantage is that fewer electrical control lines are needed in the node.

Figure 8:
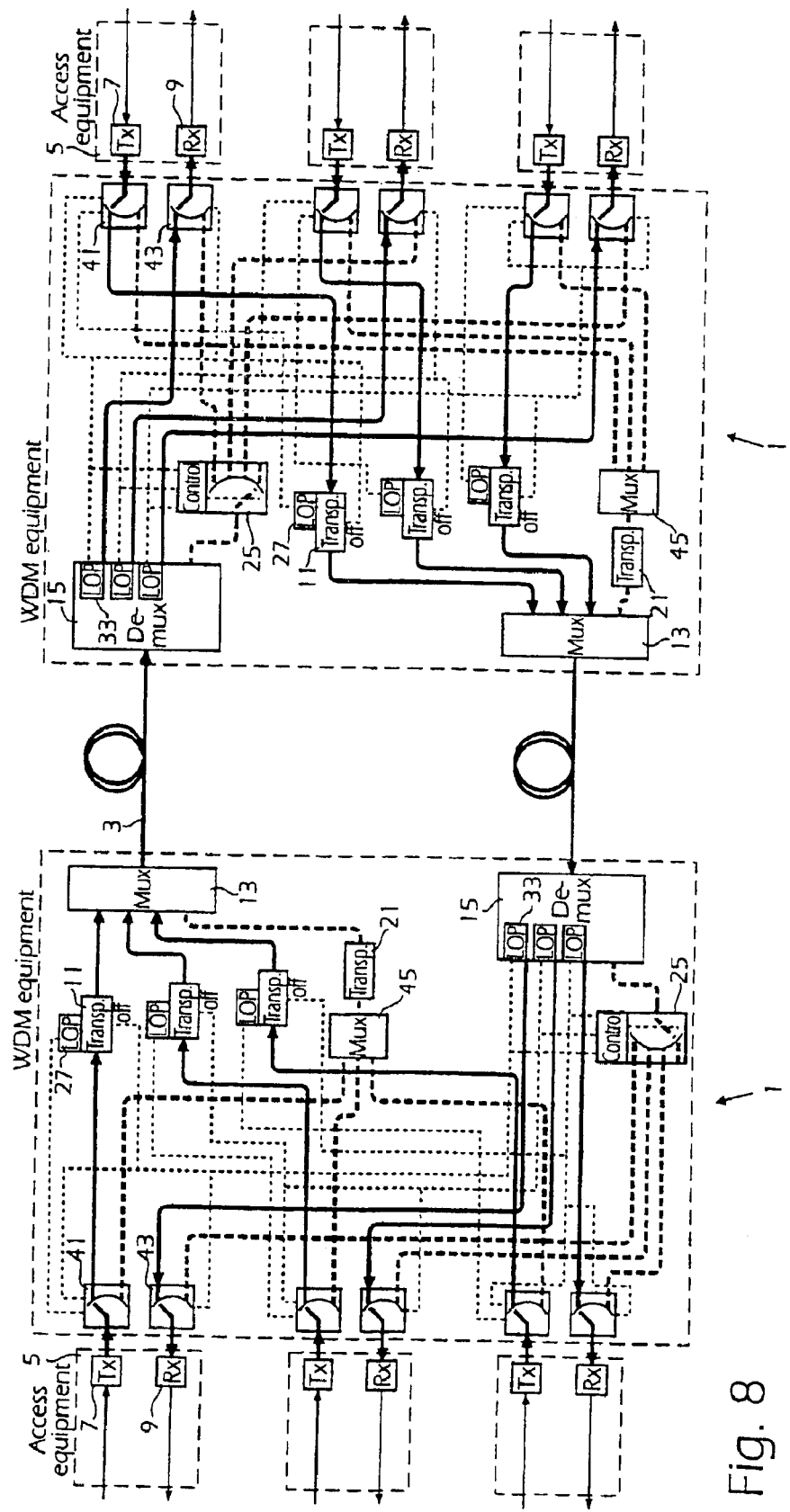
Figure 9:
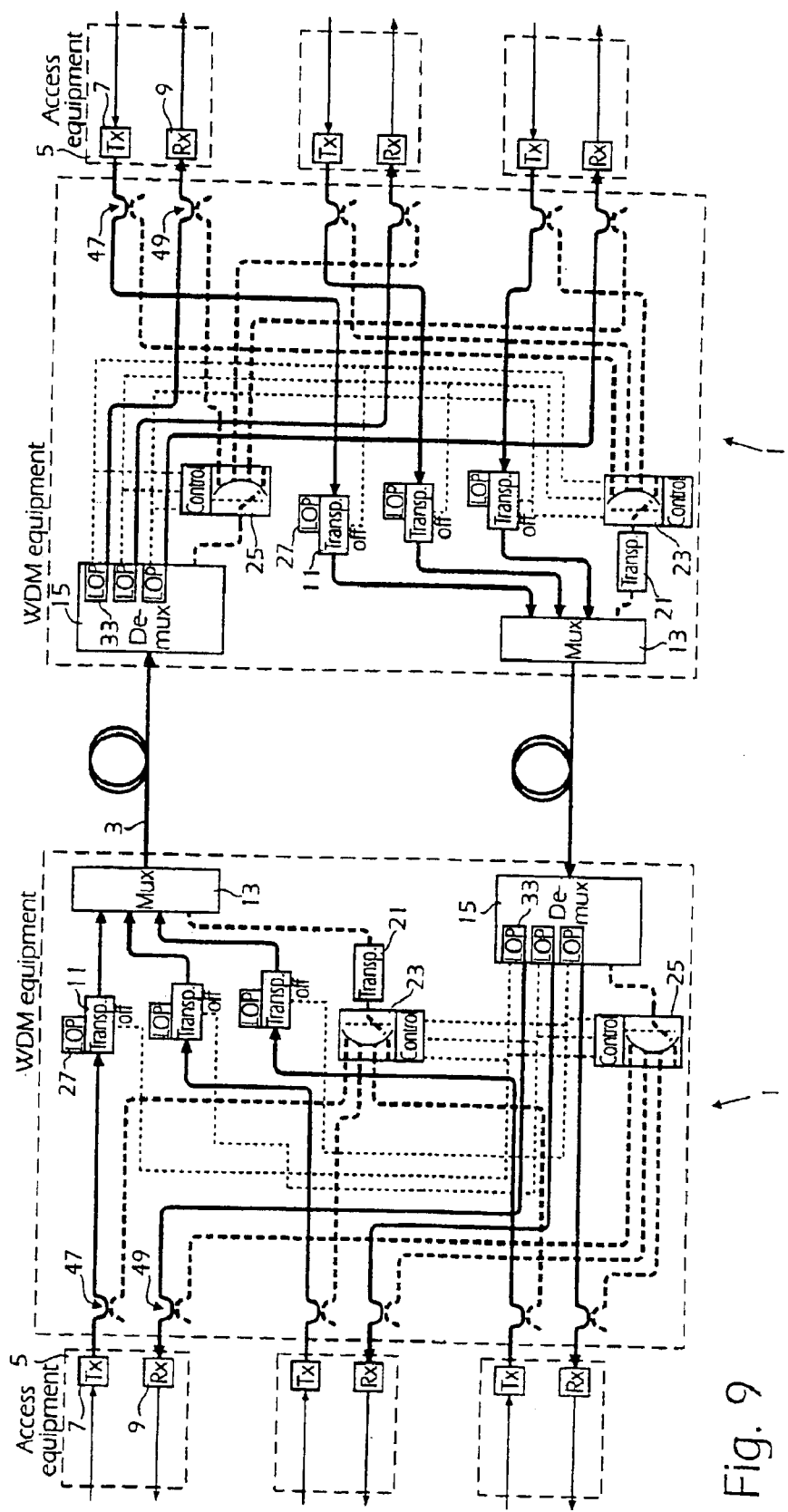

Another modification is that no spare transmitters 7' and/or spare receivers 9' are used. Then the respective cross-bar switches 17, 19 are replaced with simple 1:2 switches 41, 43, as illustrated by the node design shown in FIG. 8. Then also the 4:1 switch 23 can be replaced with a simpler element, a multiplexer 45 connected to the input of the spare transponder 21. Of course, the 4:1 switch 23 can be still included, as is the case of the node design illustrated in FIG. 9. Here all 2×2 cross-bar switches 17, 19 are instead replaced with 1:2 50/50% optical splitters 47, 49, so that the signal from a transmitter 7 always reaches the appropriate ordinary responder 11 and the respective input port of the 4:1 switch 23. In the case where an ordinary transponder 11 fails, this is detected as above and the 4:1 switch 23 is then set to the respective position, so that the standby transponders 21 will now carry the traffic.

Figure 10:
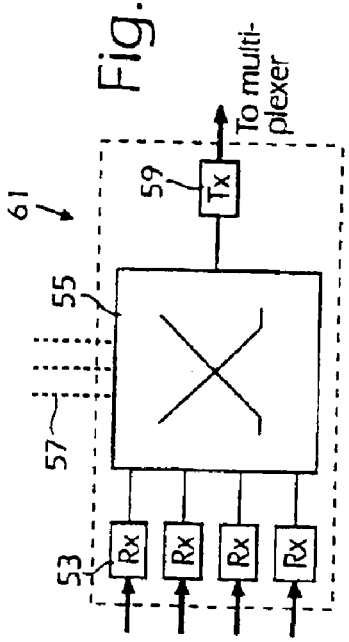
FIGS. 10 and 11 are block diagrams of 4:1 optical switches of hybrid type.

The optical space switches, i.e. the 1:2 switches 41, 43, the 2×2 cross-bar switches 17, 19 and in particular the 1:4 and 4:1 switches 23, 25 used in the node designs illustrated in FIGS. 2–9 can be replaced with alternative switches constructed not entirely of optical elements. The reason for introducing such alternatives is that particularly large optical switch matrices are not considered reliable. In the 4:1 switch 51 illustrated in FIG. 10 receivers 53 are arranged on the input side converting the light signals to electrical signals, which are provided to an electrical switch 55, switching the selected input electrical signal to the output, as commanded by electric control signals on lines 57. The electric signal is converted to an optical signal by a transmitter 59 using the wavelength adapted to that of the spare transponder, which thus can be omitted. The switch 61 of FIG. 10 can thus be used to replace the switch 23 and the spare transponder 21 of for example FIG. 2.

Figure 11:
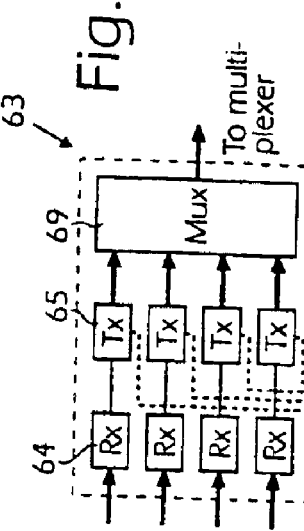

Another possibility is to use back-to-back receivers and transmitters, as is illustrated in the 4:1 switch 63 of FIG. 11. An input light signal is thus received by a receiver 64, in which it is converted to an electric signal sent to an electrooptical transmitter 65. The transmitter 65 is controlled by an electrical signal on an appropriate control line 67 and when it is activated it will transmit a light signal using the wavelength of the spare transponder. The outputs of the transmitters are all connected to an optical multiplexer, the output of which is then connected to the optical fibre 3, so that the spare transponder can be omitted. The switch 63 illustrated in FIG. 11 can be used to replace the switch 23 and the spare transponder of for example FIG. 2.

Figure 12:
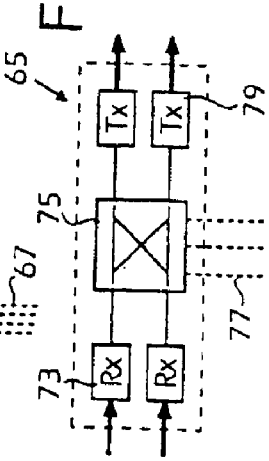
FIG. 12 is a block diagram of a hybrid type, cross-bar optical switch.

A cross-bar switch 71 to used as a switch 17, 19 shown in FIG. 2 can be designed as is illustrated in FIG. 12. The two input optical terminals are connected to optoelectrical receivers 73, which convert the light signals to electrical signals. The electrical signals are provided to a switch matrix performing 75 the cross/bar function as controlled by a suitable electrical signal on a line 77. The two outputs of the electrical cross-bar switch 75 are connected to the inputs of electrooptical transmitters 79.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. An optical WDM network comprising at least two nodes interconnected by a bidirectional optical link, at least one of the nodes comprising at least two pairs of ordinary optical transmitters and ordinary optical receivers, each pair including an ordinary optical transmitter receiving electrical signals and converting the received electrical signals to issued first optical signals and an ordinary optical receiver receiving optical signals and converting them to electrical signals, ordinary transponders, each ordinary transponder receiving the issued first optical signals from only one of the ordinary optical transmitters of the pairs and converting the received signals to issued second optical signals of a well defined wavelength band, the wavelength bands of the second optical signals issued by different ones of the ordinary transponders being separate from each other, a first optical multiplexer or combiner connected to receive the second optical signals issued by the ordinary transponders of the at least one node, the first optical multiplexer or combiner combining the second optical signals to issue a combined optical signal on an optical fiber included in the bidirectional link interconnecting the at least one node and another node, a spare transponder connected to receive, for a failure of an ordinary transponder of the at least one node, the first optical signals, which are to be received by the ordinary transponder, and to convert the received first optical signals to issued third optical signals of a well defined wavelength band separate from the wavelength bands of the second optical signals issued by the ordinary transponders in the at least one node, the spare transponder connected to the first optical multiplexer or combiner of the at least one node to provide the third optical signals to the first optical multiplexer or combiner which combines the third optical signals issued by the spare transponder of the at least one node with the second optical signals issued by the ordinary transponders of the at least one node to issue a combined optical signal on the optical fiber, and wherein said at least one of the nodes further comprises first optical switches, each first optical switch having an input and a first output and a second output, the input of the first optical switch connected to one of the ordinary optical transmitters of the at least one node and the first output connected to that ordinary transponder which is connected to receive the first optical signals issued by said one of the ordinary optical transmitters of the at least one node to forward optical signals received on the input of the first optical switch to that ordinary transponder, and the second output connected to the spare transponder to forward optical signals received on the input of the first optical switch to the spare transponder, depending on a position of the first optical switch.

2. The optical WDM network of claim 1, wherein each ordinary transponder of the at least one node comprises an input loss detector controlling that first optical switch, the first output of which is connected to the ordinary transponder.

3. The optical WDM network of claim 1, wherein the at least one node further comprises a second optical multiplexer or combiner having an output connected to an input of the spare transponder and having inputs connected to the second outputs of the first optical switches to receive the first optical signals issued by the ordinary optical transmitters and to forward the received first optical signals on the output of the second optical multiplexer or combiner to the spare transponder of the at least one node.

4. The optical WDM network of claim 1, wherein the at least one node further comprises a second optical switch having one output and a plurality of inputs connected to the second outputs of the first optical switches, and the output of the second optical switch connected to the input of the spare transponder, the second optical switch arranged to connect one of its inputs to its output in order to forward the first optical signals issued by one of the ordinary optical transmitters of the at least one node to the spare transponder of the at least one node.

5. An optical WDM network comprising at least two nodes interconnected by a bidirectional optical link, at least one of the nodes comprising:

at least two pairs of ordinary optical transmitters and ordinary optical receivers, each pair comprising an ordinary optical transmitter receiving electrical signals and converting the received electrical signals to optical signals and issuing the optical signals to another node and an ordinary optical receiver receiving optical signals from the other node and converting the received optical signals to electrical signals, and spare optical transmitters, one spare optical transmitter arranged together with an ordinary optical transmitter in a pair, the spare optical transmitter and the ordinary optical transmitter of a pair receiving the same electrical signals and converting the received electrical signals to optical signals and the spare optical transmitter arranged to issue the optical signals to the other node, if the ordinary optical transmitter fails;

wherein the at least one node further comprises first optical switches, each first optical switch connected to an ordinary optical transmitter and a spare optical transmitter of a pair to forward optical signals from only one of the ordinary optical transmitter and the spare optical transmitter; and wherein each first optical switch in the at least one node is arranged to connect, in a first position, the ordinary optical transmitter to an ordinary transponder, the ordinary transponder converting received optical signals to issued optical signals of a well defined wavelength band, the wavelength bands of different ordinary transponders in the at least one node being separate from each other, the optical signals issued by the ordinary transponders of the at least one node provided to an optical multiplexer or combiner combining the optical signals to issue them on an optical fiber connected to another node, and to connect, in a second position of the first optical switch, an ordinary transmitter to a spare transponder, the spare transponder converting received optical signals to issued optical signals of a well defined wavelength band, the wavelength band of the spare transponder being separate from the wavelength bands of the ordinary transponders in the at least one node, the optical signals issued by the spare transponder provided to the optical multiplexer or combiner to be also issued on the optical fiber.

6. The optical WDM network of claim 5, wherein in the first position of one of the first optical switches of the at least one node the spare optical transmitter which is connected to said one of the first optical switches is connected through said one of the first optical switches to the spare transponder through a second switch, the second switch allowing optical signals from at most one spare optical transmitter to reach the spare transponder.

7. The optical WDM network of claim 6, wherein in the second position of one of the first optical switches of the at least one node the ordinary optical transmitter which is connected to said one of the first optical switched is connected through the first optical switch to the spare transponder through the second switch, the second switch allowing optical signals from at most one ordinary optical transmitter to reach the spare transponder.

8. The optical WDM network of claim 5, wherein in a second position of one of the first optical switches of the at least one node the spare optical transmitter which is connected to said one of the first optical switches is connected to a respective ordinary transponder.

9. The optical WDM network of claim 5, wherein each ordinary optical transmitter of the at least one node is connected to an ordinary transponder, one ordinary transponder arranged for each ordinary optical transmitter, each of the ordinary transponders arranged to convert received optical signals to issued optical signals of a well defined wavelength band, the wavelength bands of different ordinary transponders in the at least one node being separate from each other, the optical signals issued by the ordinary transponders of the at least one node provided to an optical multiplexer or combiner combining the signals to issue them on an optical fiber connected to another node, and the spare optical transmitters connected to a spare transponder, the spare transponder converting received optical signals to issued optical signals of a well defined wavelength band, the wavelength band of the spare transponder being separate from the wavelength bands of the ordinary transponders in the at least one node, the optical signals issued by the spare transponder provided to the optical multiplexer or combiner, the connection of the spare optical transmitters to the spare transponder being made in such a way that the spare transponder receives at most optical signals issued by at most one spare transmitter.

10. The optical WDM network of claim 5, wherein all the ordinary receivers of the at least one node are connected to a single demultiplexer or filter and convert received optical signals to electrical signals.

11. The optical WDM network of claim 5, wherein all the ordinary receivers of the at least one node are connected to a single demultiplexer or filter and convert received optical signals to electrical signals, a switch provided to conduct an optical signal from the demultiplexer or filter to at most one of the ordinary receivers, this optical signal being in the same wavelength band as the optical signals issued by a spare transponder.

12. The optical WDM network of claim 5, wherein the at least one node further comprises spare optical receivers, one spare optical receiver arranged together with an ordinary optical receiver in a pair, the spare optical receiver and the ordinary optical receiver of a pair converting received optical signals to electrical signals and connected to output electrical signals to the same output terminal, so that the spare optical receiver delivers electrical signals to the output terminal, if the ordinary optical receiver cannot deliver electrical signals.

13. The optical WDM network of claim 12, wherein all the ordinary receivers of the at least one node are connected to a single demultiplexer or filter and convert received optical signals to electrical signals, each spare receiver connected to the demultiplexer or filter through a switch, the switch having a plurality of outputs, each output connected to a different one of the spare optical receivers, and the switch arranged to forward a signal from the demultiplexer or filter to at most one of the spare optical receivers.

14. The optical WDM network of claim 13, wherein a signal which is forwarded from the demultiplexer or filter to one of the spare optical receivers is in the same wavelength band as the optical signals issued by a spare transponder of the at least one node.

15. The optical WDM network of claim 13, wherein a signal which is forwarded from the demultiplexer or filter of the at least one node to one of the spare optical receivers of the at least one node is in the same wavelength band as the optical signals issued by the ordinary transmitter in the pair of an ordinary transmitter and that ordinary receiver, with which the spare receiver is included in a pair.

16. A node for connection to another node by a bidirectional optical link in an optical WDM network, the node comprising:

at least two pairs of ordinary optical transmitters and ordinary optical receivers, each pair including an ordinary optical transmitter receiving electrical signals and converting the received electrical signals to issued first optical signals and an ordinary optical receiver receiving optical signals and converting them to electrical signals, ordinary transponders, each ordinary transponder receiving the issued first optical signals from only one of the ordinary optical transmitters of the pairs and converting the received signals to issued second optical signals of a well defined wavelength band, the wavelength bands of the second optical signals issued by different ones of the ordinary transponders being separate from each other, a first optical multiplexer or combiner connected to receive the second optical signals issued by the ordinary transponders, the first optical multiplexer or combiner combining the second optical signals to issue a combined optical signal on an optical fiber included in a bidirectional link interconnecting the node and the other node, a spare transponder connected to receive, for a failure of an ordinary transponder, the first optical signals, which are to be received by the ordinary transponder, and to convert the received first optical signals to issued third optical signals of a well defined wavelength band separate from the wavelength bands of the second optical signals issued by the ordinary transponders, the spare transponder connected to the first optical multiplexer or combiner to provide the third optical signals to the first optical multiplexer or combiner which combines the third optical signals issued by the spare transponder of the node with the second optical signals issued by the ordinary transponders of the node to issue a combined optical signal on the optical fiber, and wherein the node further comprises first optical switches, each first optical switch having an input and a first output and a second output, the input of the first optical switch connected to one of the ordinary optical transmitters of the node and the first output connected to that ordinary transponder which is connected to receive the first optical signals issued by said one of the ordinary optical transmitters of the node to forward optical signals received on the input of the first optical switch to that ordinary transponder, and the second output connected to the spare transponder to forward optical signals received on the input of the first optical switch to the spare transponder, depending on a position of the first optical switch.

17. The node of claim 16, wherein each ordinary transponder of the node comprises an input loss detector controlling that first optical switch, the first output of which is connected to the ordinary transponder.

18. The node of claim 16, further comprising a second optical multiplexer or combiner having an output connected to an input of the spare transponder and having inputs connected to the second outputs of the first optical switches to receive the first optical signals issued by the ordinary optical transmitters and to forward the received first optical signals on the output of the second optical multiplexer or combiner to the spare transponder.

19. The node of claim 16, further comprising a second optical switch having one output and a plurality of inputs connected to the second outputs of the first optical switches, and the output of the second optical switch connected to the input of the spare transponder, the second optical switch arranged to connect one of its inputs to its output in order to forward the first optical signals issued by one of the ordinary optical transmitters to the spare transponder.

20. A node for connection to another node by a bidirectional optical link in an optical WDM network, the node comprising:
at least two pairs of ordinary optical transmitters and ordinary optical receivers, each pair comprising an ordinary optical transmitter receiving electrical signals and converting the received electrical signals to optical signals and issuing the optical signals to another node and an ordinary optical receiver receiving optical signals from the other node and converting the received optical signals to electrical signals,
spare optical transmitters, one spare optical transmitter arranged together with an ordinary optical transmitter in a pair, the spare optical transmitter and the ordinary optical transmitter of a pair receiving the same electrical signals and converting the received electrical signals to optical signals and the spare optical transmitter arranged to issue the optical signals to the other node, if the ordinary optical transmitter fails, and
first optical switches, each first optical switch connected to an ordinary optical transmitter and a spare optical transmitter of a pair to forward optical signals from only one of the ordinary optical transmitter and the spare optical transmitter;
wherein each first optical switch is arranged to connect, in a first position, the ordinary optical transmitter to an ordinary transponder, the ordinary transponder converting received optical signals to issued optical signals of a well defined wavelength band, the wavelength bands of different ordinary transponders being separate from each other, the optical signals issued by the ordinary transponders provided to an optical multiplexer or combiner combining the optical signals to issue them on an optical fiber connected to another node, and to connect, in a second position of the first optical switch, an ordinary transmitter to a spare transponder, the spare transponder converting received optical signals to issued optical signals of a well defined wavelength band, the wavelength band of the spare transponder being separate from the wavelength bands of the ordinary transponders, the optical signals issued by the spare transponder provided to the optical multiplexer or combiner to be also issued on the optical fiber.

21. The node of claim 20, wherein in the first position of one of the first optical switches the spare optical transmitter which is connected to said one of the first optical switches is connected through said one of the first optical switches to the spare transponder through a second switch, the second switch allowing optical signals from at most one spare optical transmitter to reach the spare transponder.

22. The node of claim 21, wherein in the second position of one of the first optical switches the ordinary optical transmitter which is connected to said one of the first optical switched is connected through the first optical switch to the spare transponder through the second switch, the second switch allowing optical signals from at most one ordinary optical transmitter to reach the spare transponder.

23. The node of claim 20, wherein in a second position of one of the first optical switches the spare optical transmitter which is connected to said one of the first optical switches is connected to a respective ordinary transponder.

24. The node of claims 20, wherein each ordinary optical transmitter is connected to an ordinary transponder, one ordinary transponder arranged for each ordinary optical transmitter, each of the ordinary transponders arranged to convert received optical signals to issued optical signals of a well defined wavelength band, the wavelength bands of different ordinary transponders being separate from each other, the optical signals issued by the ordinary transponders provided to an optical multiplexer or combiner combining the signals to issue them on an optical fiber connected to another node, and the spare optical transmitters connected to a spare transponder, the spare transponder converting received optical signals to issued optical signals of a well defined wavelength band, the wavelength band of the spare transponder being separate from the wavelength bands of the ordinary transponders, the optical signals issued by the spare transponder provided to the optical multiplexer or combiner, the connection of the spare optical transmitters to the spare transponder being made in such a way that the spare transponder receives at most optical signals issued by at most one spare transmitter.

25. The node of claim 20, wherein all the ordinary receivers are connected to a single demultiplexer or filter and convert received optical signals to electrical signals.

26. The node of claim 20, wherein all the ordinary receivers are connected to a single demultiplexer or filter and convert received optical signals to electrical signals, a switch provided to conduct an optical signal from the demultiplexer or filter to at most one of the ordinary receivers, this optical signal being in the same wavelength band as the optical signals issued by a spare transponder.

27. The node of claim 20, further comprising spare optical receivers, one spare optical receiver arranged together with an ordinary optical receiver in a pair, the spare optical receiver and the ordinary optical receiver of a pair converting received optical signals to electrical signals and connected to output electrical signals to the same output terminal, so that the spare optical receiver delivers electrical signals to the output terminal, if the ordinary optical receiver cannot deliver electrical signals.

28. The node of claim 27, wherein all the ordinary receivers are connected to a single demultiplexer or filter and convert received optical signals to electrical signals, each spare receiver connected to the demultiplexer or filter through a switch, the switch having a plurality of outputs, each output connected to a different one of the spare optical receivers, and the switch arranged to forward a signal from the demultiplexer or filter to at most one of the spare optical receivers.

29. The node of claim 28, wherein a signal which is forwarded from the demultiplexer or filter to one of the spare optical receivers is in the same wavelength band as the optical signals issued by a spare transponder of the at least one node.

30. The node of claim 28, wherein a signal which is forwarded from the demultiplexer or filter to one of the spare optical receivers is in the same wavelength band as the optical signals issued by the ordinary transmitter in the pair of an ordinary transmitter and that ordinary receiver, with which the spare receiver is included in a pair.

* * * * *